US012524375B2

United States Patent
Carey et al.

(10) Patent No.: US 12,524,375 B2
(45) Date of Patent: Jan. 13, 2026

(54) CONTAINER-LEVEL MANAGEMENT OF COMPRESSED FILE SYSTEM DATA

(71) Applicant: Microsoft Technology Licensing, LLC, Redmond, WA (US)

(72) Inventors: Omar Carey, Redmond, WA (US); Rajsekhar Das, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/730,731

(22) PCT Filed: Jan. 31, 2023

(86) PCT No.: PCT/US2023/061681
§ 371 (c)(1),
(2) Date: Jul. 19, 2024

(87) PCT Pub. No.: WO2023/164356
PCT Pub. Date: Aug. 31, 2023

(65) Prior Publication Data
US 2025/0117366 A1    Apr. 10, 2025

(30) Foreign Application Priority Data
Feb. 4, 2022  (LU) .................................. LU501388

(51) Int. Cl.
G06F 16/00    (2019.01)
G06F 16/13    (2019.01)
G06F 16/174   (2019.01)

(52) U.S. Cl.
CPC .......... *G06F 16/1744* (2019.01); *G06F 16/13* (2019.01)

(58) Field of Classification Search
None
See application file for complete search history.

(56) References Cited

U.S. PATENT DOCUMENTS 8,433,823 B2    4/2013   Hugly
8,615,500 B1   12/2013   Armangau
(Continued)

OTHER PUBLICATIONS

International Search Report and Written Opinion received for PCT Application No. PCT/US2023/061681, (MS#41871-PCT01) Sep. 18, 2023, 12 pages.
(Continued)

*Primary Examiner* — Hasanul Mobin
(74) *Attorney, Agent, or Firm* — Workman Nydegger

(57) ABSTRACT

A file system volume's space is internally allocated as a set of containers, with each container corresponding to a different subset of storage clusters. The set of containers includes a first container corresponding to a first subset of storage clusters storing first data that is compressed according to a first set of compression attributes, a second container corresponding to a second subset of storage clusters storing second data that is uncompressed, and a third container corresponding to a third subset of storage clusters that are free. Based on determining that the second data of the second container is to be compressed, compressed second data is created based on a second set of compression attributes. The second set of compression attributes is different than the first set of compression attributes. The compressed second data is written to the third subset of storage clusters of the third container.

20 Claims, 10 Drawing Sheets

(56) References Cited

U.S. PATENT DOCUMENTS

| | | |
|---|---|---|
| 9,582,513 B2 | 2/2017 | Pletcher |
| 9,767,154 B1 | 9/2017 | Wallace et al. |
| 10,223,377 B1 | 3/2019 | Moghe |
| 10,715,176 B1* | 7/2020 | Singh ................... G06F 17/18 |
| 10,795,812 B1 | 10/2020 | Duggal |
| 11,526,469 B1* | 12/2022 | Mathews ............ H03M 7/6058 |
| 11,907,973 B2* | 2/2024 | Nolet ................ G06Q 30/0275 |
| 2011/0219186 A1* | 9/2011 | Amit ....................... G06F 13/12 |
| | | 711/117 |
| 2015/0149739 A1* | 5/2015 | Seo ..................... G06F 3/0608 |
| | | 711/162 |
| 2016/0255357 A1* | 9/2016 | Sun ......................... G06F 18/23 |
| | | 375/240.08 |
| 2017/0064320 A1* | 3/2017 | Sadhwani ................. G06T 1/20 |
| 2017/0199707 A1* | 7/2017 | Varghese .............. G06F 3/0608 |
| 2020/0042399 A1 | 2/2020 | Kuang et al. |
| 2020/0089784 A1* | 3/2020 | Li ......................... G06F 3/0608 |
| 2020/0358621 A1 | 11/2020 | Ngo |
| 2021/0405882 A1* | 12/2021 | Venkatasubbaiah ........................ G06F 3/0641 |
| 2022/0091874 A1* | 3/2022 | Janakiram ............. G06F 9/4856 |
| 2022/0121695 A1* | 4/2022 | Zhang .................... G06N 3/045 |
| 2022/0138989 A1* | 5/2022 | Fuller ................... G06T 3/4007 |
| | | 382/232 |
| 2025/0117366 A1* | 4/2025 | Carey .................... G06F 16/13 |

OTHER PUBLICATIONS

Kesavan, et al., "Countering fragmentation in an enterprise storage system." ACM Transactions on Storage (TOS), vol. 15, Issue No. 4, Jan. 2020, pp. 1-35.

Search Report and Written Opinion Issued in Luxembourg Application No. LU501388, (MS#410871-LU01) Mailed on Sep. 16, 2022, 7 pages.

Communication pursuant to Article 94(3) EPC, Received for European Application No. 23741902.3, (MS# 410871-EP01-PCT) mailed on May 13, 2025, 6 pages.

* cited by examiner

CONTAINER-LEVEL MANAGEMENT OF COMPRESSED FILE SYSTEM DATA

CROSS-REFERENCE TO RELATED APPLICATIONS

The present application is a U.S. National Stage of International Application No. PCT/US2023/061681, filed on 31 Jan. 2023, designating the United States and claiming the priority of Luxembourg Patent Application No. LU501388 filed with the Luxembourg Intellectual Property Office on 4 Feb. 2022. All of the aforementioned applications are incorporated herein in their respective entirety by this reference.

TECHNICAL FIELD

The present disclosure relates to systems, methods, and devices that compress data within a file system volume.

BACKGROUND

Computer systems commonly store data on, and access data from, computer storage media. When doing so, computer systems often utilize file systems to organize data stored on computer storage media into files, which can be further organized hierarchically within volumes, directories, and the like. In order to reduce the physical storage space required to store a given data set, some file systems support compression of the stored data. In some file systems, this compression operates on a per-file basis. When compressing file system data on a per-file basis, the file system identifies and compresses all of a file's data, and stores compression-related metadata (e.g., the physical disk location(s) of the compressed data, compression attributes etc.) along with the file's data record. Alternatively, in some file systems this compression operates on a volume as a whole. When compressing a file system volume as a whole, the file system compresses all of the volumes' data clusters using the same compression parameters.

BRIEF SUMMARY

The inventors have recognized deficiencies when compressing file system data both on a per-file basis and on a per-volume basis. Generally, compression algorithms operate more efficiently (i.e., to create higher compression ratios) as the amount of data being operated on by the compression algorithm increases. This presents challenges when compressing file system data on a per-file basis, since smaller files may contain insufficient data to result in efficient compression. Additionally, compressing file system data on a per-volume basis lacks flexibility, all data stored on the volume needs to be compressed. Further, that compression is performed using a single set of compression parameters, and those compression parameters cannot be changed once compression is enabled without destroying and recreating the entire volume.

At least some embodiments described herein compress stored data of a file system volume, and manage that compression, at a container level—as opposed to per-file or per-volume as is conventional. In embodiments, a container is a fixed allocation chunk that is used to internally manage storage space of a file system volume, where each container comprises a plurality of storage clusters and maps to a corresponding chunk of physical storage. In embodiments, by managing compression at a container level, the embodiments herein enable a single file system volume to include a combination of compressed containers and uncompressed containers. This leads to flexibility in the management of stored data, such as by being able to compress data that is read less frequently (thus conserving storage resources), while also being able to enable leave data that is read more frequently uncompressed (thus preserving read performance).

Additionally, the embodiments herein enable each compressed container to be associated with its own set of compression attributes—such as compression unit size and compression algorithm. Through use of a heat map, the embodiments herein can intelligently choose which container(s) to compress, as well as an appropriate set of compression attributes for each compressed container. By enabling a mix of uncompressed and compressed containers, and by enabling each container to be associated with its own set of compression attributes, the embodiments herein are able to achieve a compromise between reducing the storage footprint of a files system volume and reducing the decompression costs (e.g., in terms of latency and processing power) for reading compressed data.

Additionally, by managing compression at a container level, as opposed to a file or volume level, the embodiments herein can decouple the compression of data from the actual files living on the volume. Thus, for example, in the case of a virtual machine (VM) image, the read-cold portions of the VM (i.e., those portions that are least frequently read) can be compressed, while the read-hot portions of the VM (i.e., those portions that are most frequently read) are not. Further, data from multiple files can be compressed at once, which increases the efficiency of compression algorithms.

At least some embodiments described herein also support container decompression and container recompression. Thus, the embodiments herein enable the mix of compressed and uncompressed data within a volume to change over time, based on the makeup of the data stored on the volume, and based on the data read/write characteristics for the volume. For example, the embodiments herein enable uncompressed data that has become read-cold to be compressed, and enable compressed data that has become read-hot to be decompressed. Additionally, through container decompression and container recompression, the embodiments herein enable sparse holes in a compressed container's data allocations be freed, reclaiming underlying physical storage space, and hence improving the overall data storage efficiency.

In some aspects, the techniques described herein relate to a method, implemented at a computer system that includes a processor, for managing compression of file system data at a container level, the method including: identifying a set of containers corresponding to a file system volume, each container in the set of containers corresponding to a different subset of storage clusters of the file system volume, the set of containers including at least: a first container corresponding to a first subset of storage clusters storing first data that is compressed according to a first set of compression attributes, a second container corresponding to a second subset of storage clusters storing second data that is uncompressed, and a third container corresponding to a third subset of storage clusters that are free; determining that the second data of the second container is to be compressed; and based on determining that the second data of the second container is to be compressed, compressing the second data into the third container, including: identifying a second set of compression attributes for use when compressing the second data, the second set of compression attributes being different than the first set of compression attributes; creating compressed second data based at least on compressing the second data according to the second set of compression attributes; and writing the compressed second data to the third subset of storage clusters of the third container.

In some aspects, the techniques described herein relate to a computer system for managing compression of file system data at a container level, including: a processor; and a computer storage media that stores computer-executable instructions that are executable by the processor to cause the computer system to at least: identify a set of containers corresponding to a file system volume, each container in the set of containers corresponding to a different subset of storage clusters of the file system volume, the set of containers including at least: a first container corresponding to a first subset of storage clusters storing first data that is compressed according to a first set of compression attributes, a second container corresponding to a second subset of storage clusters storing second data that is uncompressed, and a third container corresponding to a third subset of storage clusters that are free; determine that the second data of the second container is to be compressed; and based on determining that the second data of the second container is to be compressed, compress the second data into the third container, including: identifying a second set of compression attributes for use when compressing the second data, the second set of compression attributes being different than the first set of compression attributes; creating compressed second data based at least on compressing the second data according to the second set of compression attributes; and writing the compressed second data to the third subset of storage clusters of the third container.

In some aspects, the techniques described herein relate to a computer program product including a computer storage media that stores computer-executable instructions that are executable by a processor to cause a computer system to manage compression of file system data at a container level, the computer-executable instructions including instructions that are executable by the processor to cause the computer system to at least: identify a set of containers corresponding to a file system volume, each container in the set of containers corresponding to a different subset of storage clusters of the file system volume, the set of containers including at least: a first container corresponding to a first subset of storage clusters storing first data that is compressed according to a first set of compression attributes, a second container corresponding to a second subset of storage clusters storing second data that is uncompressed, and a third container corresponding to a third subset of storage clusters that are free; determine that the second data of the second container is to be compressed; and based on determining that the second data of the second container is to be compressed, compress the second data into the third container, including: identifying a second set of compression attributes for use when compressing the second data, the second set of compression attributes being different than the first set of compression attributes; creating compressed second data based at least on compressing the second data according to the second set of compression attributes; and writing the compressed second data to the third subset of storage clusters of the third container.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
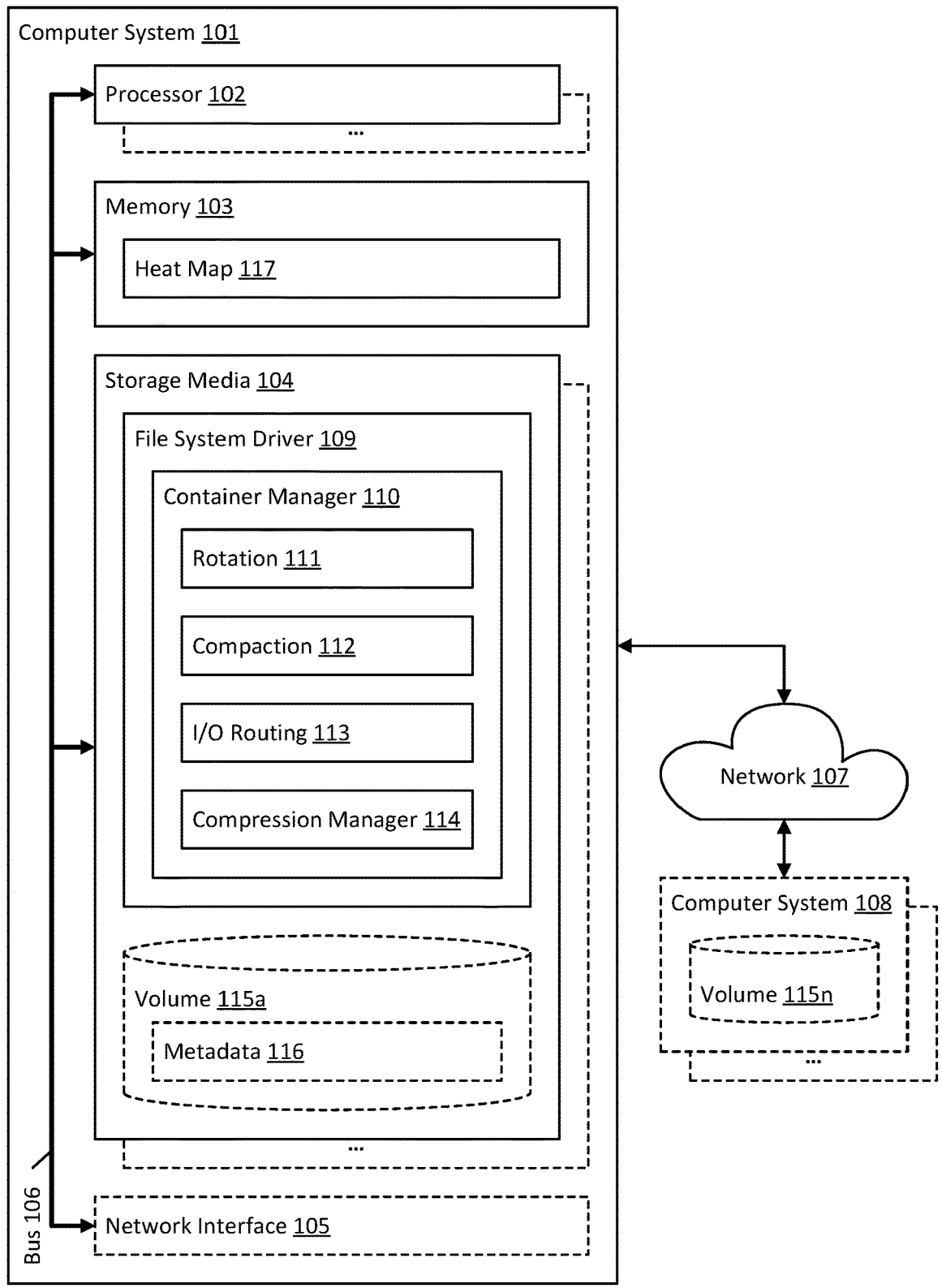
FIG. 1 illustrates an example computer architecture that facilitates container-level management of compressed file system data.

FIG. 1 illustrates an example computer architecture 100 that facilitates container-level management of compressed file system data. As shown, computer architecture 100 includes a computer system 101 comprising a processor 102 (or a plurality of processors), a memory 103, and one or more computer storage media (storage media 104), all interconnected by a bus 106. As shown, computer system 101 may also include a network interface 105 for interconnecting (via a network 107) to computer system(s) 108.

The storage media 104 is illustrated as storing computer-executable instructions implementing at least a file system driver 109 that operates to interface with, and manage, a file system volume (volume 115). As indicated by volume 115a, in embodiments the volume 115 resides on one (or more) of the storage media 104. As indicated by volume 115n, in embodiments the volume 115 additionally, or alternatively, resides at remote storage on one (or more) of computer system(s) 108. As an example, the volume 115 may be the Resilient File System (ReFS) designed by MICROSOFT CORP. Regardless of where the volume 115 resides, the volume 115 comprises metadata 116, such as a file system database. In embodiments, the metadata 116 is persistently stored along with the volume 115 (e.g., at storage media 104, at computer system(s) 108). In embodiments, at least a portion of the metadata 116 is loaded by the file system driver 109 into memory 103, such as when the volume 115 is mounted by the file system driver 109.

In accordance with the embodiments herein, the file system driver 109 uses the metadata 116 to internally manage its storage space using a plurality of fixed allocation chunks, referred to herein as containers, and thus the file system driver 109 is illustrated as including a container manager 110 for managing those containers. In embodiments, each container maps to a corresponding chunk of physical storage. In embodiments, each container stores data corresponding to a plurality of files and/or corresponding to only a subset of data for a given file.

Figure 3A:
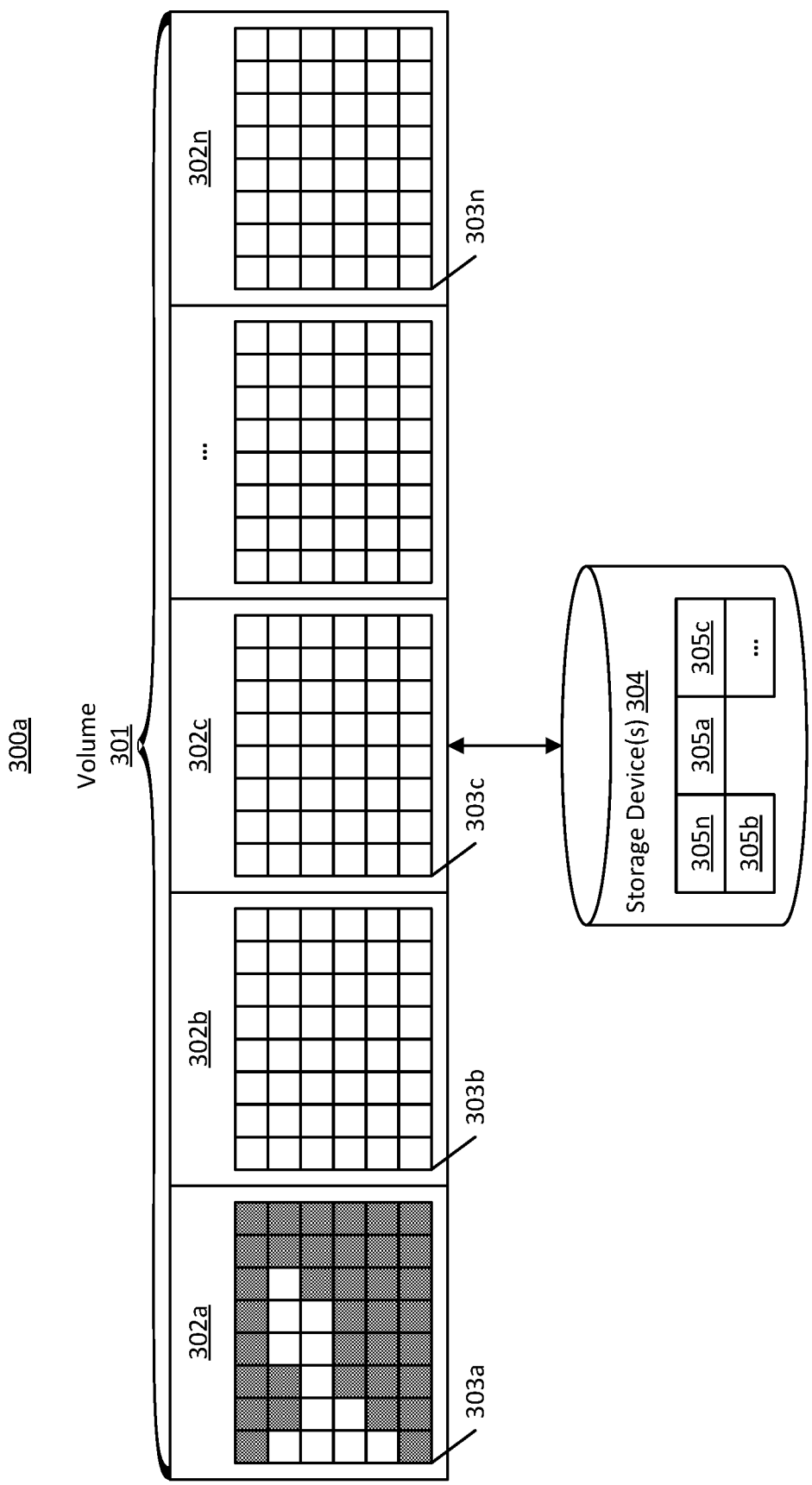
FIG. 3A illustrates an example of a file system volume whose internal storage space is allocated using containers.

To illustrate use of containers to internally manage storage space of a file system volume, FIG. 3A illustrates an example 300a of a file system volume whose internal storage space is allocated using containers. In example 300a, a volume 301 (e.g., volume 115) allocates its internal storage space across a plurality of containers 302 (i.e., container 302a, container 302b, container 302c, and so on until container 302n—with a container labeled with ellipses indicating that the volume 301 can comprise any number of containers). Additionally, in example 300a each of containers 302 maps to a corresponding one of storage chunks 305 within at least one storage device within storage device(s) 304. In example 300a, container 302a maps to storage chunk 305a, container 302b maps to storage chunk 305b, container 302c maps to storage chunk 305c, container 302n maps to storage chunk 305n, etc. In example 300a, the storage chunks 305 are illustrated in non-consecutive order, to indicate that the storage chunks 305 need not be stored sequentially on a storage device, and that the storage chunks 305 need to even be all stored on the same storage device.

In embodiments, each container comprises a consecutive plurality of storage clusters, such as a plurality of clusters that are each 4 KB in size, a plurality of clusters that are each 64 KB in size, etc. For instance, example 300a shows that container 302a comprises a cluster subset 303a comprising one plurality of clusters, container 302b comprises a cluster subset 303b comprising another plurality of clusters, container 302c comprises a cluster subset 303c comprising yet another plurality of clusters, and so on until container 302n that comprises a cluster subset 303n. Since each container comprises a consecutive plurality of storage clusters, each container comprises a storage space that is a multiple of the cluster size. In embodiments, containers are each 64 MB in size, are each 128 MB in size, are each 256 MB in size, etc.

In embodiments, the file system driver 109 implements a file system that is copy-on-write such that, when executing writes, an input/output (I/O) routing component (I/O routing component 113) of the container manager 110 directs those writes to containers comprising free storage clusters, rather than modifying data already stored in an allocated storage cluster (i.e., a cluster storing live data). In embodiments, when the storage clusters within a given container are full, that container is sealed.

The container manager 110 is also illustrated as including a rotation component 111. In embodiments, the rotation component 111 copies the content stored in a first container to an empty second container, and then frees the storage clusters associated with the first container. In embodiments, the rotation component 111 facilities tiering technologies, in which the volume 115 is stored across a plurality of storage devices having different performance characteristics. For example, using a combination of faster physical storage (e.g., one or more solid-state drives) and slower physical storage (e.g., one or more hard disk drives), the container manager 110 can store one subset of containers on the faster physical storage (e.g., a fast tier) and can store another subset of containers on the slower physical storage (e.g., a slow tier). Using the rotation component 111, the container manager 110 can move stored data between storage tiers, by moving the stored content of a container backed by a physical storage device in one tier into an empty container backed by another physical storage device in another tier.

Figure 3B:
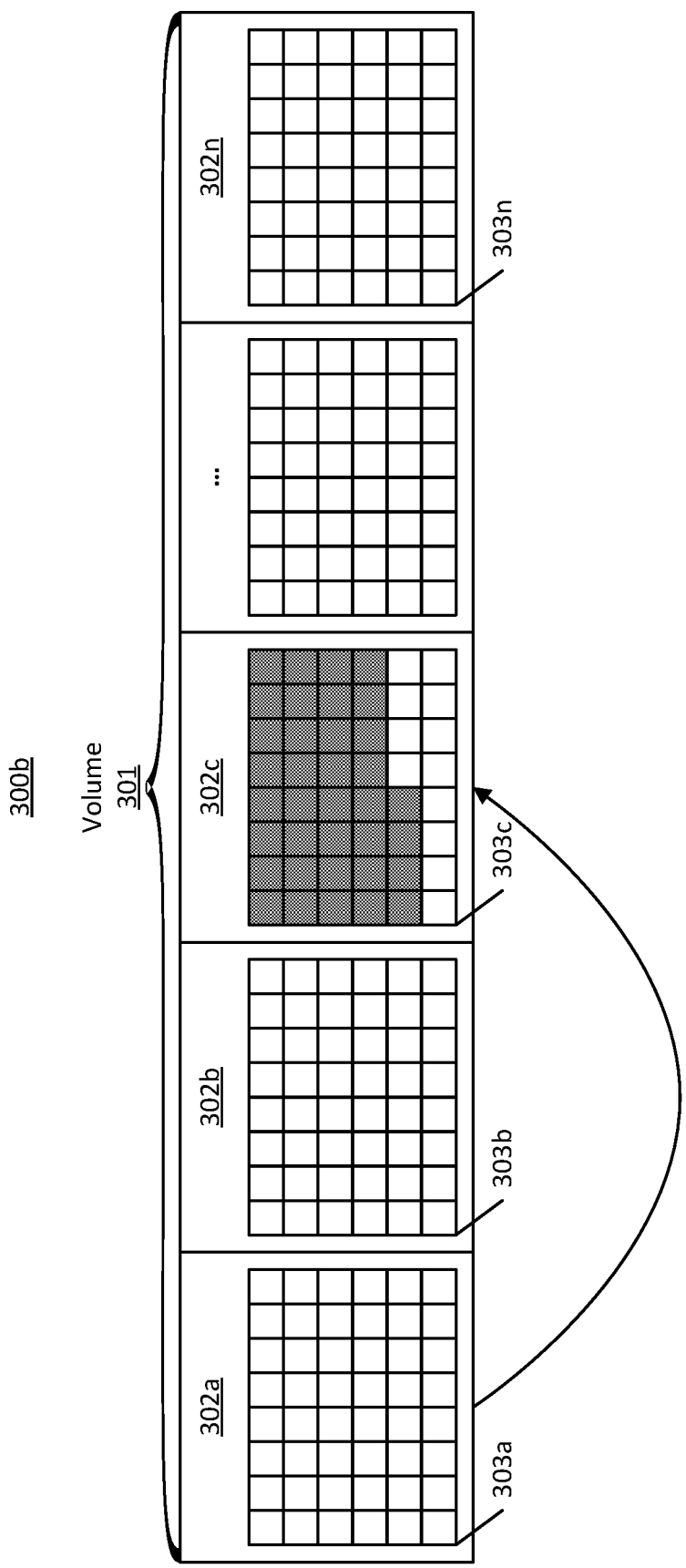
FIG. 3B illustrates an example of compaction of a container.

The container manager 110 is also illustrated as including a compaction component 112. In embodiments, the compaction component 112 reclaims unused space within a partially used first container, by identifying allocated clusters within the first container, by copying the contents of those allocated clusters to consecutive free clusters of a second container, and by freeing the storage clusters associated with the first container. For instance, in example 300a some of cluster subset 303a within container 302a are shown with shading to indicate that they are allocated clusters (i.e., storing live data), while some of cluster subset 303a are shown without shading to indicate that they are free clusters (e.g., due to data deletion, due to a superseding write to another container, etc.). FIG. 3B illustrates an example 300b of compaction of a container. As shown in example 300b, the compaction component 112 has identified the allocated clusters within container 302a, has copied the data stored in those clusters to the cluster subset 303c of container 302c, and has freed cluster subset 303a. As shown, the compaction component 112 has also compacted this data into consecutive clusters within cluster subset 303c.

In accordance with the embodiments herein, the file system driver 109 comprises a compression manager 114, which operates to compress stored data of the volume 115, and to manage that compression at the container level, as opposed to per-file or per-volume as is conventional. For example, the file system driver 109 chooses an uncompressed container for compression, compresses that container's stored data using a set of compression attributes, and stores that compressed data into free clusters of a different container that is used exclusively to store compressed data. Notably, by managing compression at the container level the compression of data is independent from higher-level constructs, such as files, to which the data belongs. In embodiments, the compression manager 114 operates continually in the background, or occasionally—such in connection with operation of the compaction component 112. For example, in some embodiments, the compression manager 114 is triggered by the compaction component 112, to initiate compression of a container that is being compacted by the compaction component 112.

In embodiments, volume 115 can include a combination of compressed containers and uncompressed containers. However, the volume 115 may alternatively include only compressed containers, such as for ingestion of read-only data sets where many reads are not expected post-ingestion (e.g., for data archival). Additionally, in embodiments, each compressed container can be associated with its own set of compression attributes; thus, the volume 115 can include a plurality of compressed containers having different sets of compression attributes. For example, in embodiments, each compressed container is associated with at least a corresponding compression unit size and a corresponding compression algorithm (including algorithm-specific settings). Thus, in embodiments, the volume 115 includes compressed containers having differing compression units and/or differing compression algorithms. As used herein, a compression unit size is an amount of uncompressed data that is compressed as a single unit. For example, for a given uncompressed container, the compression manager 114 may can compress every 8 KB of data, every 64 KB of data, every 1 MB of data, and the like, independent of the actual file(s) to which that data belongs. As examples, compression algorithms include variants of the Xpress Compression Algorithm, such as LZ77+Huffman, Plain LZ77, or LZNT1; LZ4; and Zstandard.

Figure 4A:
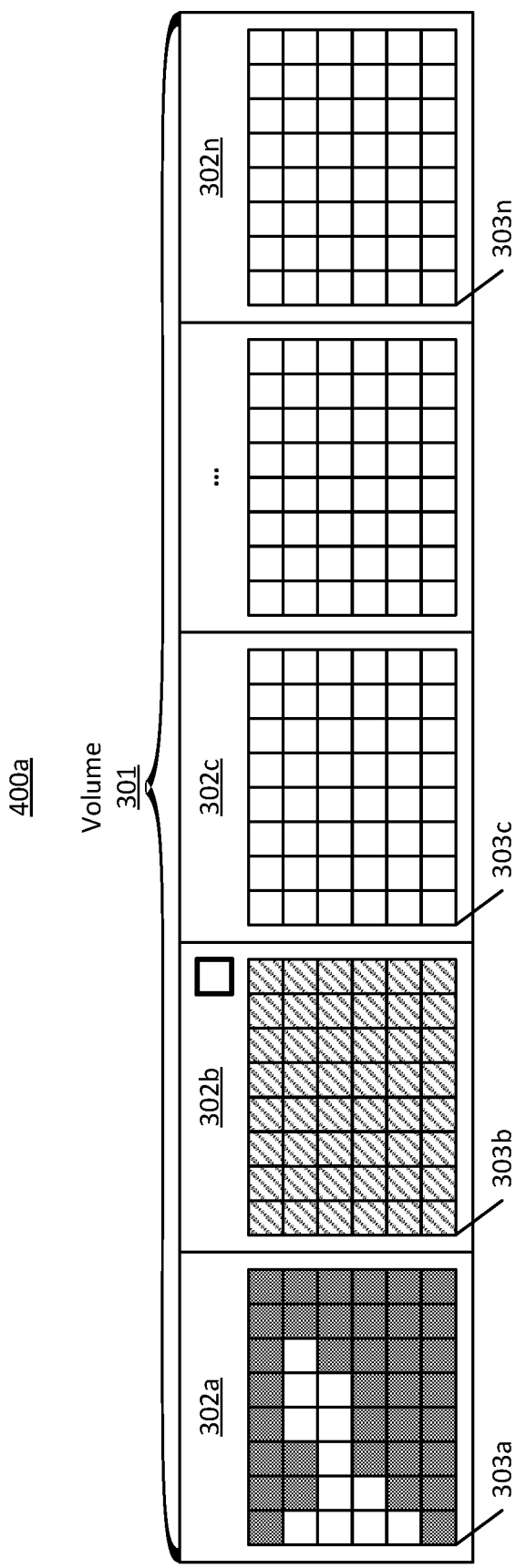
FIG. 4A illustrates an example of a file system volume that manages compression at a container level.

FIG. 4A illustrates an example 400a of a file system volume that manages compression at a container level. In particular, example 400a shows the volume 301 introduced in FIG. 3A, whose internal storage space is allocated using a plurality of containers 302. However, in example 400a cluster subset 303a of container 302a is shown as storing uncompressed data (as indicated by shaded clusters). Additionally, cluster subset 303b of container 302b is shown as storing compressed data; in particular, the clusters within the cluster subset 303b are shown with forward diagonal lines, indicating that the data they store is compressed using a first compression algorithm. Container 302b also contains a square, visually indicating a compression unit size associated with the compressed data stored within container 302b. For example, the compression unit size for container 302b may be a cluster size (e.g., 4 KB, 64 KB, etc.) of cluster subset 303b.

Figure 4B:
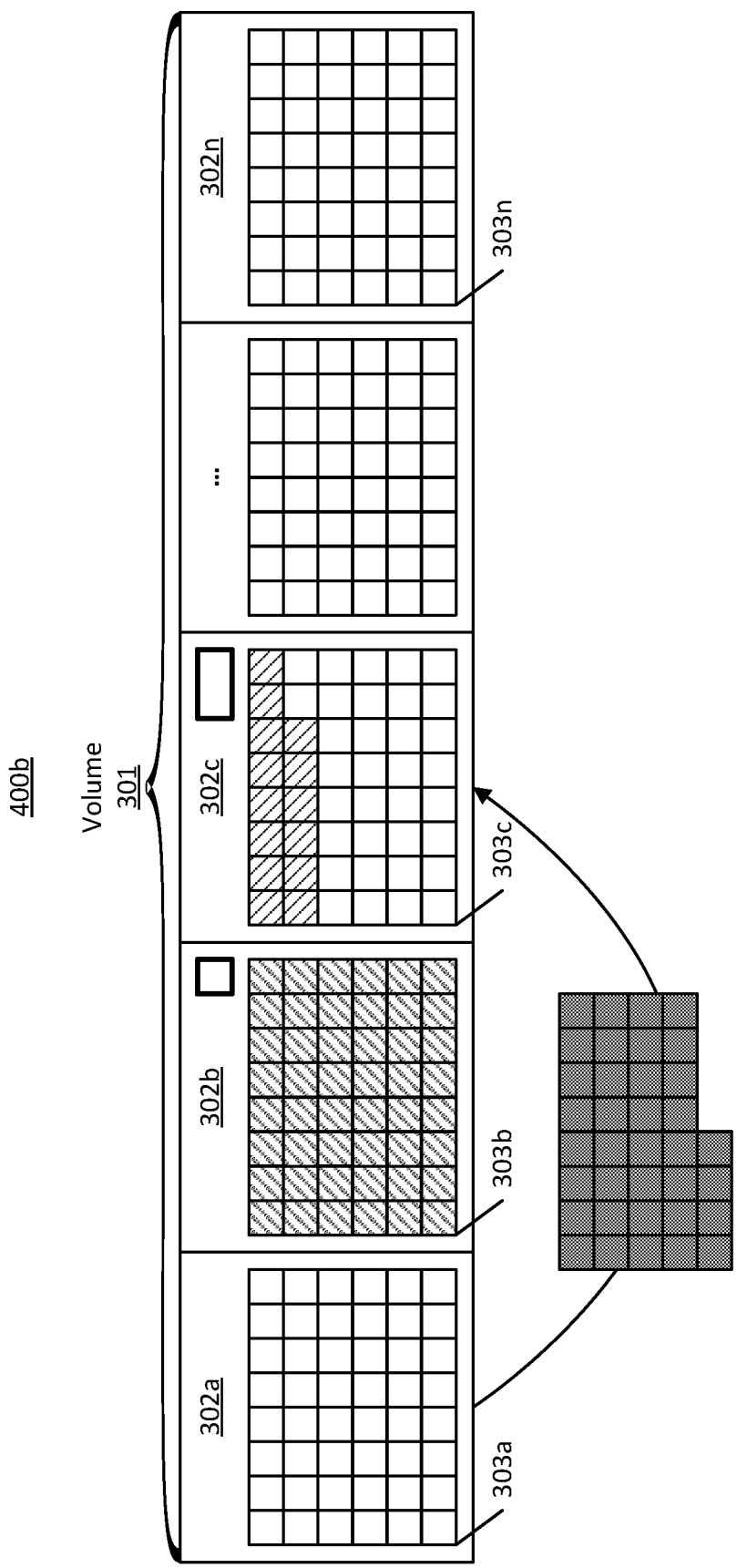
FIG. 4B illustrates an example of compression of a container.

FIG. 4B illustrates an example 400b of compression of a container. In example 400b, the compression manager 114 reads the uncompressed data from container 302a (i.e., the uncompressed data shown in container 302a in example 400a), compresses that data using a chosen set of compression attributes (e.g., a compression algorithm and a compression unit size), and writes the compressed data into container 302c. The allocated clusters within cluster subset 303c are shown with backward diagonal lines, indicating the data they store is compressed using a second compression algorithm that is different than the first compression algorithm used by container 302b. Additionally, container 302c contains a rectangle, visually indicating a compression unit size associated with the compressed data stored within container 302c. For example, the compression unit size for container 302c may be double the cluster size used by container 302b.

Example 400b also shows that the data read from container 302a is compacted (e.g., by the compaction component 112) prior to compression. As shown, the container manager 110 frees storage previously occupied by the uncompressed data within container 302a (e.g., after the compression manager 114 has written the corresponding compressed data into container 302c).

While example 400b shows container 302c being filled only with compressed data originating from uncompressed data from container 302a, in embodiments this container 302c would also be filled with compressed data from one or more other containers, such that the cluster subset 303c of container 302c are filled (or substantially filled). In embodiments, once a compressed container, such as container 302c, is filled (or substantially filled) that container is "sealed," such that it is no longer eligible to receive writes.

Figure 4C:
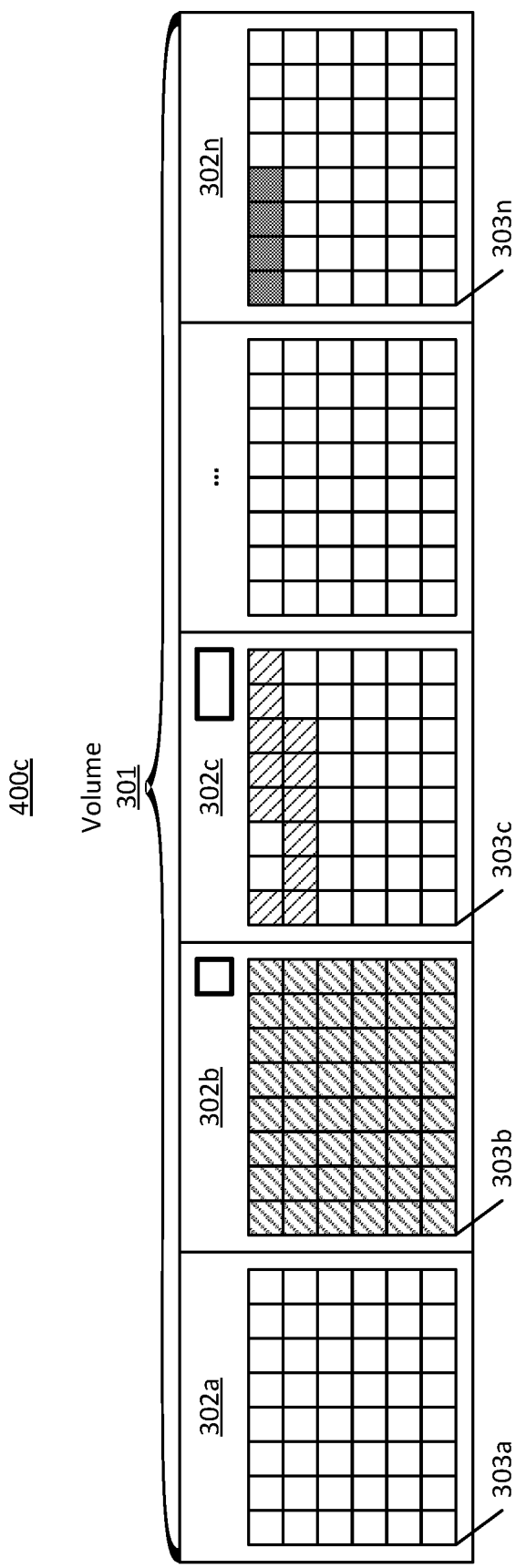
FIG. 4C illustrates an example of reallocation of writes to a compressed container.

In embodiments, writes to a sealed compressed container (i.e., that would modify data stored on the compressed container) are reallocating (e.g., by the I/O routing component 113), such that they land on an uncompressed container instead. For example, FIG. 4C illustrates an example 400c of reallocation of writes to a compressed container. In example 400c, writes that would modify data stored on container 302c are redirected to container 302n as uncompressed writes. Additionally, corresponding clusters within container 302c are marked as free since they no longer store "live" data in the file system. Notably, marking these clusters as free creates fragments within container 302c, resulting in one or more "sparse holes" within cluster subset 303c.

Figure 4D:
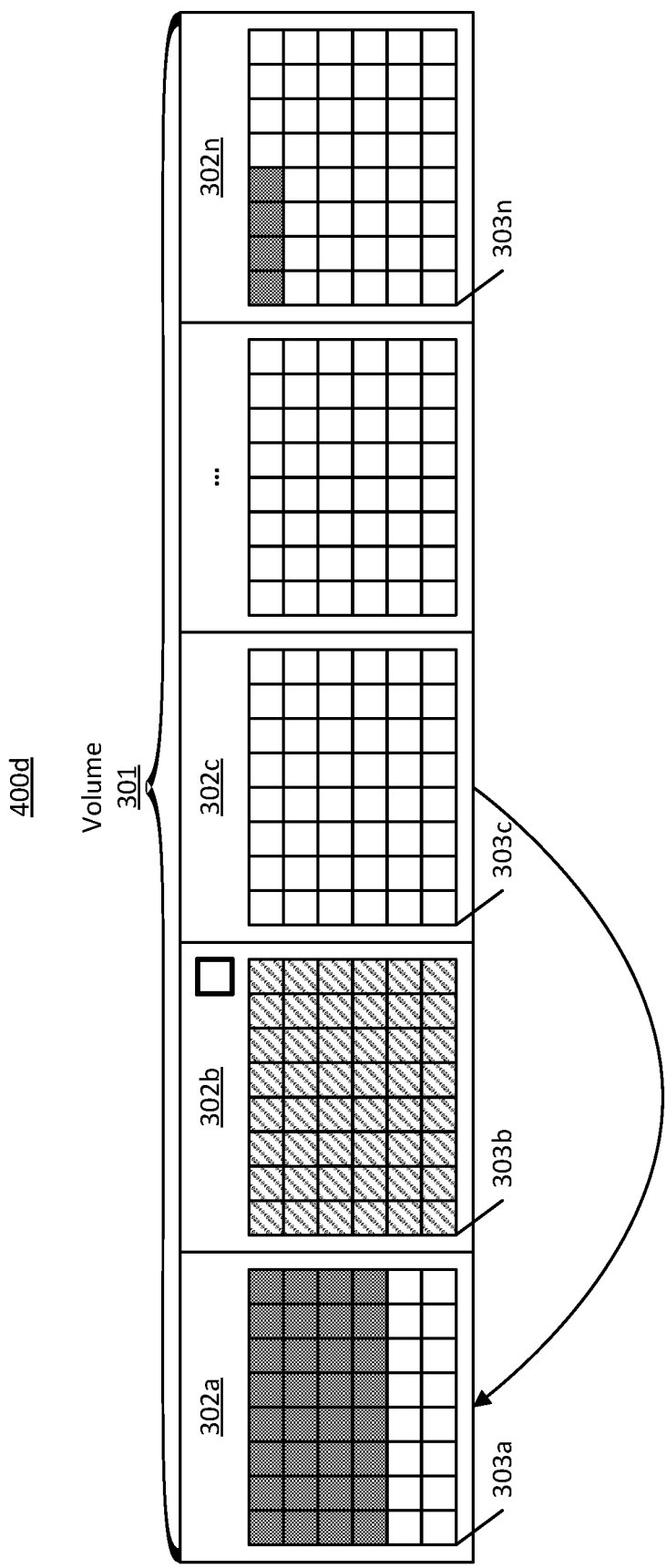
FIG. 4D illustrates an example of decompression of a container.

In embodiments, the compression manager 114 also supports container decompression, where an entire container is decompressed. FIG. 4D illustrates an example 400d of decompression of a container. In example 400d, the compression manager 114 reads compressed data from container 302c (i.e., the uncompressed data shown in container 302c in example 400c), decompresses that data, and writes the decompressed data into one or more other containers, such as container 302a.

Figure 4E:
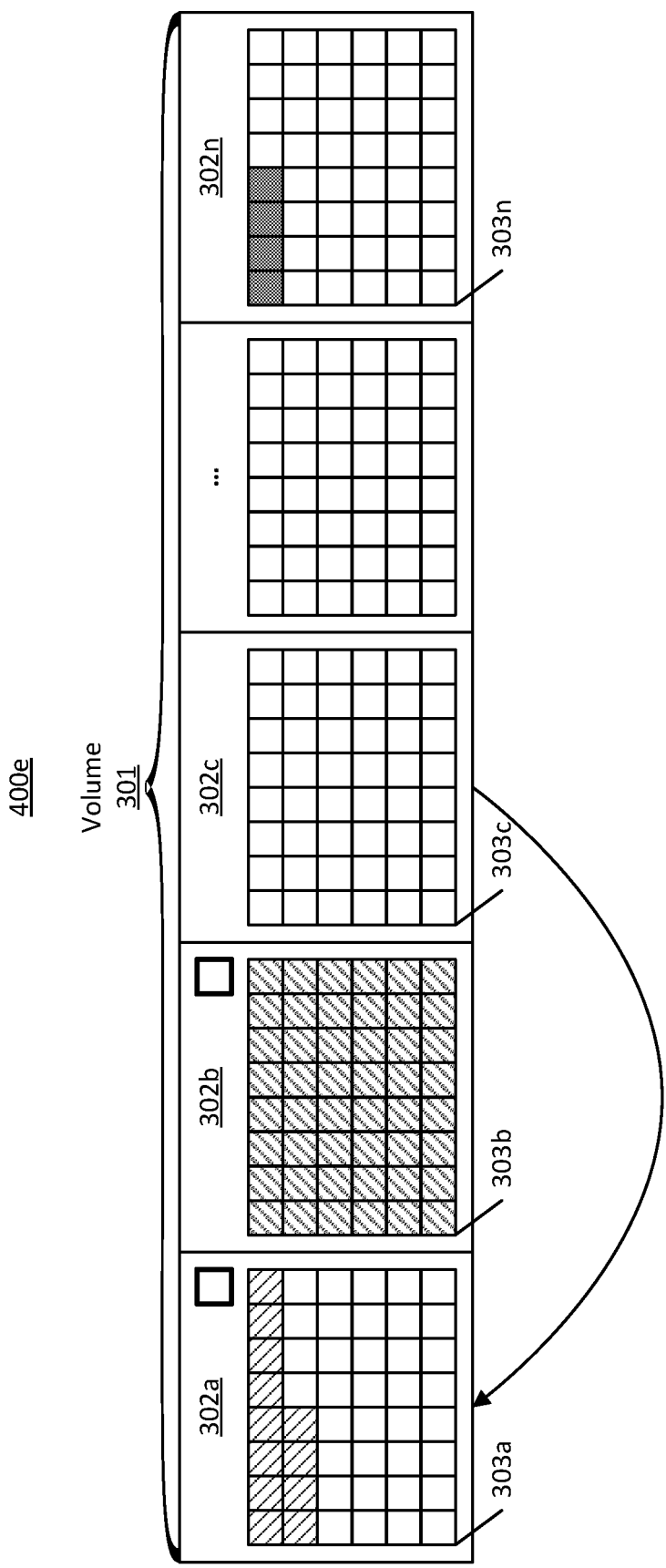
FIG. 4E illustrates an example of recompression of a container.

In embodiments, the compression manager 114 also supports container recompression, where an entire container is decompressed and then recompressed using the same set of compression attributes, or a different set of compression attributes. FIG. 4E illustrates an example 400e of recompression of a container. In example 400e, the compression manager 114 reads compressed data from container 302c (i.e., the uncompressed data shown in container 302c in example 400c), decompresses that data, recompresses the compressed data (using the same or a different set of compression attributes), and writes the recompressed data into container 302a. In example 400e, the allocated clusters within cluster subset 303a are shown with backward diagonal lines, indicating the data they store is compressed using the second compression algorithm. However, container 302a contains a square, visually indicating that the data has been recompressed using a different compression unit size.

Notably, container decompression and recompression can be used to compact the compressed data within a container and remove any sparse holes to reclaim underlying physical storage space. For instance, example 400c showed sparse holes within cluster subset 303c, and example 400e shows that those sparse holes have been removed when the data is recompressed into container 302a.

Notably, when compressing data, the larger the compression unit size, the more efficient compression becomes (i.e., higher compression ratios are achieved). However, the minimum read unit is a compression unit, so larger compression unit sizes come with a tradeoff of read amplification and decompression overheads—for example, with a compression unit size of 1 MB, a read of 128 KB requires reading (and decompressing) the compressed data corresponding to the entire 1 MB compression unit. In embodiments, the compression manager 114 determines which container(s) to compress based on maintaining a heat map that tracks the read and/or write heat for each container, where a hotter container is defined as one that is incurring more reads and/or writes relative to its peers. In embodiments, this heat map assigns a heat score to each container, based on I/O statistics for each container—such as an average I/O size for each container, how often each container is read, when each container was last read, how cold or hot a container is relative to a neighboring container, and the like.

In embodiments, the compression manager 114 uses the heat map to identify and compress relatively read-cold containers (i.e., the ones that are incurring the least amount of reads on the volume 115), and to identify and decompresses containers as they become more read-hot. As used herein, a "read-cold" container is a container that receives fewer reads than one or more other containers within the volume, while a "read-hot" container is a container that receives more reads than one or more other containers within the volume. In embodiments, compressing read-cold containers in favor of read-hot containers reduces read amplification and decompression overheads, as less data are being read from compressed containers than uncompressed containers.

In embodiments, when compressing a container, the compression manager 114 also uses the heat map (and/or underlying I/O statistics) to determine an appropriate set of compression attributes (e.g., compression unit size and compression algorithm) to use when compressing that container's data. For example, based on I/O statistics such as a read frequency and a read size I/O for a given container, the compression manager 114 can determine an appropriate compression unit size and an appropriate compression algorithm for the container.

In embodiments, the file system driver 109 is extensible, to support the addition of new compression algorithms. Thus, it is possible that the volume 115 could include a container that is compressed using a compression algorithm that is not supported by a current version of the file system driver 109 (e.g., because the container was compressed by a newer version of the file system driver 109 operating at a different computer system). In embodiments, the file system driver 109 recognizes when a volume contains a container that is compressed using an unsupported compression algorithm, and generates a notification (e.g., an error message, a log entry, etc.) that informs a user that an updated version of the file system driver 109 is needed in order to read and/or fully decompress the volume.

Figure 2:
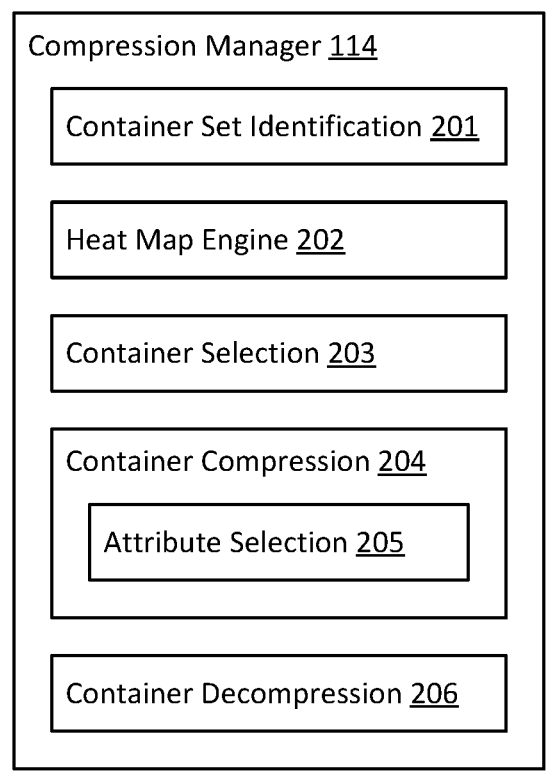
FIG. 2 illustrates an example of components of a compression manager within the example computer architecture of FIG. 1.

FIG. 2 illustrates an example 200 of components of the compression manager 114. Each depicted component of the compression manager 114 represents one or more functions that the compression manager 114 implements, in accordance with one or more embodiments. It will be appreciated, however, that the depicted components are presented merely as an aid in describing various embodiments of the compression manager 114, and that the compression manager 114 could include only a subset of these components, or that the compression manager 114 could include one or more additional components.

The illustrated components of the compression manager 114 are now further described in connection with FIG. 5, which illustrates a flow chart of an example method 500 for managing compression of file system data at a container level. In embodiments, instructions for implementing method 500 are encoded as computer-executable instructions (e.g., file system driver 109, including the compression manager 114) stored on a computer program product (e.g., storage media 104) that are executable by a processor (e.g., processor 102) to cause a computer system (e.g., computer system 101) to perform method 500.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 2, the compression manager 114 is also shown as including a container set identification component 201. In embodiments, the container set identification component 201 identifies a set of containers within a volume 115 on which to perform container compression-related operations, such as to compress one or more containers in the set; to decompress one or more containers in the set; to recompress one or more containers in the set; or to maintain a heat map for the set of containers.

Figure 5:
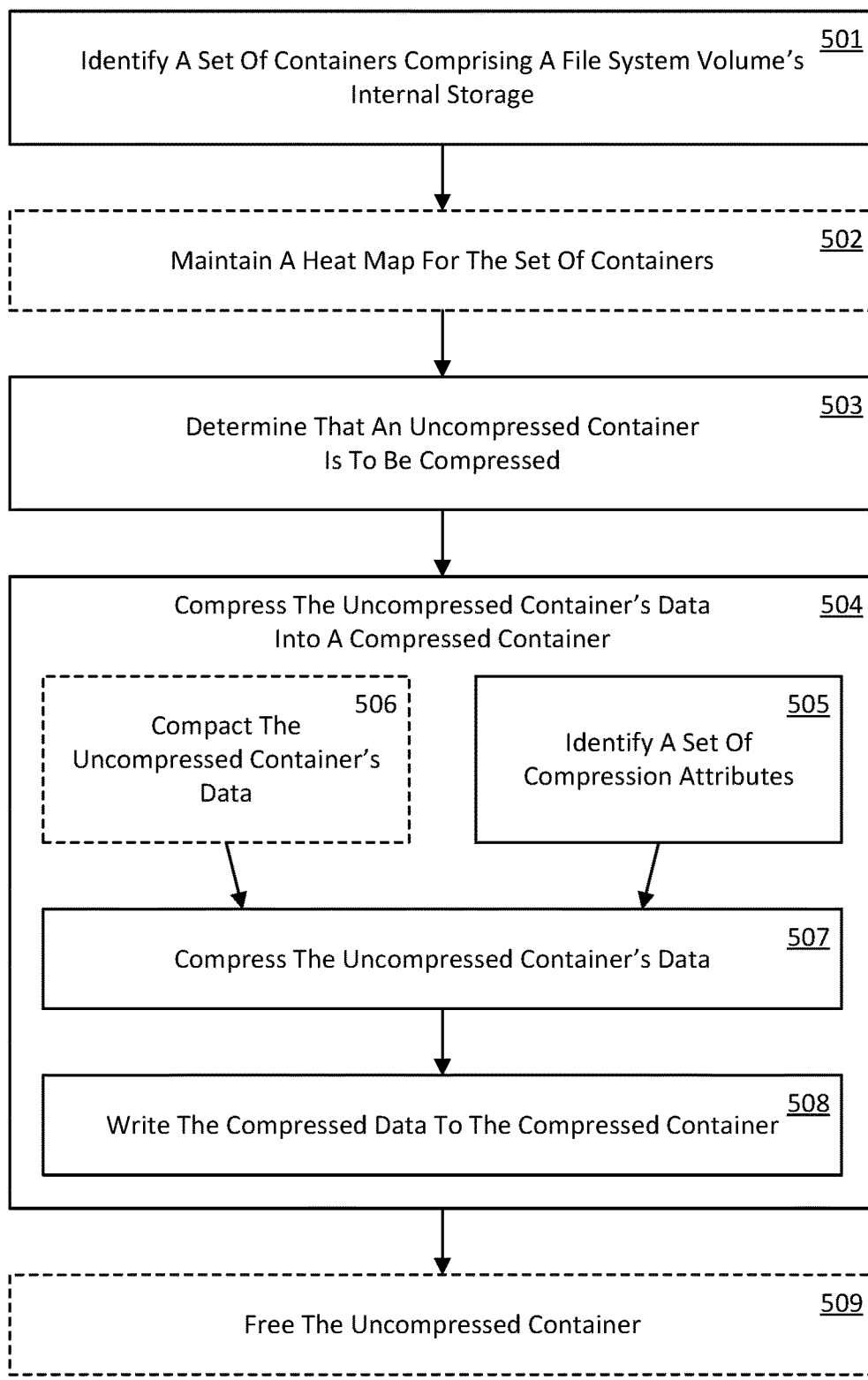
FIG. 5 illustrates a flow chart of an example method for managing compression of file system data at a container level.

Referring to FIG. 5, in embodiments, method 500 comprises an act 501 of identifying a set of containers comprising a file system volume's internal storage. In some embodiments, act 501 comprises identifying a set of containers corresponding to a file system volume, each container in the set of containers corresponding to a different subset of storage clusters of the file system volume. In an example, the container set identification component 201 identifies containers 302, which internally manage storage space of volume 301. In embodiments, the set of containers include at least a first container corresponding to a first subset of storage clusters storing first data that is compressed according to a first set of compression attributes, a second container corresponding to a second subset of storage clusters storing second data that is uncompressed, and a third container corresponding to a third subset of storage clusters that are free. In example 400a, for instance, containers 302 include container 302a (i.e., with cluster subset 303a storing data that is uncompressed), container 302b (i.e., with cluster subset 303b storing data that is compressed using a first compression unit size and compression algorithm), and container 302c (i.e., with cluster subset 303c that is free).

Referring to FIG. 2, the compression manager 114 is also shown as including a heat map engine 202. In embodiments, the heat map engine 202 maintains a heat map 117 (see memory 103) that tracks the relative heat of each container within a set of containers identified by the container set identification component 201. In embodiments, the heat map engine 202 tracks the read and/or write heat for each container based on I/O statistics for each container, such as an average I/O size for each container, how often each container is read, when each container was last read, how cold or hot a container is relative to a neighboring container, and the like.

Referring to FIG. 5, in some embodiments, method 500 also comprises an act 502 of maintaining a heat map for the set of containers. In some embodiments, act 502 comprises maintaining a heat map that tracks a corresponding set of I/O statistics for each container of the set of containers. In an example, the heat map engine 202 maintains a heat map 117 for the containers 302 identified in act 501. By maintaining this heat map 117, the heat map engine 202 enables intelligent and automated management of which containers are compressed and decompressed, and what compression attributes to use when compressing each container.

Referring to FIG. 2, the compression manager 114 is also shown as including a container selection component 203. In embodiments, the container selection component 203 selects a given container for compression, decompression, or container recompression (e.g., to remove sparse holes). In embodiments, the container selection component 203 utilizes the heat map 117 maintained by the heat map engine 202. For example, container selection component 203 uses the heat map 117 to identify and compress read-cold containers, and/or to identify and decompresses containers as they become more read-hot. The container selection component 203 can choose a container in some other way, such as based on the physical disk to which the container maps.

Referring to FIG. 5, method 500 also comprises an act 503 of determining that an uncompressed container is to be compressed. In some embodiments, act 503 comprises determining that the second data of the second container is to be compressed. In an example, in the context of example 400a, the container selection component 203 selects container 302a for compression. As indicated, the container selection component 203 may utilize the heat map 117 as part of this selection, such as to select a container that is read-cold (e.g., as compared to its peers). Thus, in some embodiments of act 503, determining that the second data of the second container is to be compressed is based at least on a corresponding set of I/O statistics for the second container.

Referring to FIG. 2, the compression manager 114 is also shown as including a container compression component 204. In embodiments, the container compression component 204 compresses the contents of container identified by the container selection component 203 (e.g., in act 503). Referring to FIG. 5, method 500 also comprises an act 504 of compressing the uncompressed container's data into a compressed container. In some embodiments, act 504 comprises, based on determining that the second data of the second container is to be compressed, compressing the second data into the third container.

Referring to FIG. 2, among other things, the container compression component 204 includes an attribute selection component 205. In embodiments, the attribute selection component 205 determines a set of compression attributes to use when compressing the container selected by the container selection component 203 (e.g., in act 503). In embodiments, the attribute selection component 205 utilizes the heat map 117 maintained by the heat map engine 202. For example, the attribute selection component 205 selects a set of compression attributes (e.g., compression unit size and compression algorithm) to use based on I/O statistics such as a read frequency and a read size I/O for the container.

Referring to FIG. 5, act 504 comprises an act 505 of identifying a set of compression attributes. In some embodiments, act 505 comprises identifying a second set of compression attributes for use when compressing the second data, the second set of compression attributes being different than the first set of compression attributes. In an example, the attribute selection component 205 identifies a set of compression attributes to use when compressing container 302a.

As mentioned, in embodiments compression attributes include a compression unit size and a compression algorithm. Thus, in some embodiments of method 500, the first set of compression attributes comprises a first compression unit size and a first compression algorithm, and the second set of compression attributes comprises a second compression unit size and a second compression algorithm. In embodiments, each container can have its own set of compression attributes, such as its own set of compression unit size and compression algorithm. Thus, in embodiments of method 500, the first compression unit size is different than the second compression unit size. Additionally, or alternatively, in embodiments of method 500 the first compression algorithm is different than the second compression algorithm.

As indicated, the attribute selection component 205 may utilize the heat map 117 as part of its selection of compression attributes. Thus, in some embodiments of act 505, identifying the second set of compression attributes for use when compressing the second data is based on the corresponding set of I/O statistics for the second container.

As mentioned, in embodiments the compression manager 114 operates in connection with the compaction component 112 to compact uncompressed data prior to compressing that data. Thus, in some embodiments, method 500 includes an act 506 of compacting the uncompressed container's data. In some embodiments of act 506, creating the compressed second data is also based on compacting the second data prior to compressing the second data. For instance, example 400b shows that the data read from container 302a is compacted prior to compression. In FIG. 5, there is no ordering illustrated between act 505 and act 506. Thus, in embodiments, act 505 and act 506 could be performed serially (in either order), or in parallel.

Act 504 also comprises an act 507 of compressing the uncompressed container's data. In some embodiments, act 507 comprises, creating compressed second data based at least on compressing the second data according to the second set of compression attributes. In an example the container compression component 204 compresses the data from container 302a, according to the set of compression attributes determined by the attribute selection component 205 (e.g., in act 505).

Act 504 also comprises an act 508 of writing the compressed data to the compressed container. In some embodiments, act 508 comprises writing the compressed second data to the third subset of storage clusters of the third container. In an example, and as illustrated in example 400b, the container compression component 204 writes the compressed data generated in act 507 into container 302c.

In embodiments, once the data of an uncompressed container has been written to a compressed container, the container manager 110 frees the storage space associated with the uncompressed container. Thus, in some embodiments, method 500 also includes an act 509 of freeing the uncompressed container. Some embodiments, act 509 comprises based at least on compressing the second data into the third container, freeing the second subset of storage clusters of the second container. In an example, and as illustrated in example 400b, the container manager 110 frees the cluster subset 303a associated with container 302a.

Referring to FIG. 2, the compression manager 114 is also shown as including a container decompression component 206. In embodiments, the container decompression component 206 decompresses the contents of a compressed container, which can be written to a compressed container, or which can be recompressed. In embodiments, the container decompression component 206 operates on a container in response to the container selection component 203 using the heat map 117 to select the container for decompression, based on the container becoming more read-hot than its peer containers. Thus, in some embodiments, method 500 also includes, based on a corresponding set of I/O statistics for the third container, decompressing the compressed second data into an additional container. For instance, example 400d illustrated decompression of container 302c into container 302a.

As discussed in connection with example 400c, in embodiments writes to a compressed container are reallocating (e.g., by the I/O routing component 113), such that those writes land on an uncompressed container instead. Thus, in some embodiments, method 500 also comprises, after writing the compressed second data to the third subset of storage clusters of the third container, identifying a write operation to a portion of the second data, and redirecting the write operation to one or more free clusters of a fourth container as an uncompressed write. For example, in example 400c, writes to container 302c are reallocated as uncompressed writes to container 302n. As shown in example 400c, in embodiments, corresponding clusters within container 302c are marked as free since they no longer store "live" data in the file system. Thus, in some embodiments, method 500 also comprises marking one or more clusters of the third container that correspond to the portion of the second data as free.

As discussed in connection with example 400d, in embodiments an entire container is decompressed, while compacting the compressed data to remove any sparse holes and reclaim underlying physical storage space. Thus, in some embodiments, method 500 also comprises uncompressing the compressed second data to create uncompressed second data; creating compacted second data from the uncompressed second data, based at least one removing the portion of the second data form the uncompressed second data; and writing the compacted second data to a fifth container. For example, in example 400*d*, data stored in container 302*c* is uncompressed, compacted, and written into container 302*a*. Additionally, in embodiments, the cluster subset 303*c* of container 302*c* are freed, such that method 500 also comprises freeing the third subset of storage clusters.

As discussed in connection with example 400*e*, in embodiments a decompressed (and compacted) container is also recompressed. Thus, in embodiments of method 500 writing the compacted second data to the fifth container comprises compressing the compacted second data according to a third set of compression attributes. In embodiments, the third set of compression attributes could be the same as the second set of compression attributes, or could be different (e.g., different compression unit size and/or different compression algorithm).

Accordingly, the embodiments herein compress stored data of a file system volume, and manage that compression, at a container level—as opposed to per-file or per-volume as is conventional. By managing compression at a container level, the embodiments herein enable a single file system volume to include a combination of compressed containers and uncompressed containers. This leads to flexibility in the management of stored data, such as by being able to compress data that is read less frequently (thus conserving storage resources), while also being able to enable leave data that is read more frequently uncompressed (thus preserving read performance). Additionally, the embodiments herein enable each compressed container to be associated with its own set of compression attributes—such as compression unit size and compression algorithm. Through use of a heat map, the embodiments herein can intelligently choose which container(s) to compress, as well as an appropriate set of compression attributes for each compressed container. By enabling a mix of uncompressed and compressed containers, and by enabling each container to be associated with its own set of compression attributes, the embodiments herein are able to achieve a compromise between reducing the storage footprint of a files system volume and reducing the decompression costs (e.g., in terms of latency and processing power) for reading compressed data. This improves overall data storage efficiency for a given volume, while also preserving speed of access to frequently accessed data within that volume. Additionally, by managing compression at a container level, as opposed to a file or volume level, the embodiments herein can decouple the compression of data from the actual files living on the volume. This enables data from multiple files to be compressed together, which increases compression ratios and further improves data storage efficiency.

The embodiments herein also support container decompression and container recompression, enabling the makeup of compressed and uncompressed data within a volume to change over time, based on the makeup of the data stored on the volume, and based on the data read/write characteristics for the volume. This enables the balance between data storage efficiency and read efficiency for a volume to be dynamically adjusted as the data stored on the volume and/or the read/write usage of the volume changes. Additionally, through container decompression and container recompression, the embodiments herein enable sparse holes in a compressed container's data allocations be freed, reclaiming underlying physical storage space, and hence improving the overall data storage efficiency.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a computer-readable medium comprising instructions which, when executed by a computer, cause the computer to carry out one or more of the methods described herein. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:
1. A method, implemented at a computer system that includes a processor, comprising:
identifying a set of containers corresponding to a file system volume, each container in the set of containers corresponding to a different subset of storage clusters of the file system volume, the set of containers including at least:
a first container corresponding to a first subset of storage clusters storing first data that is compressed according to a first set of compression attributes,
a second container corresponding to a second subset of storage clusters storing second data that is uncompressed, and
a third container corresponding to a third subset of storage clusters that are free;
compressing a portion of second data of the second container into the third container, including:
identifying a second set of compression attributes for use when compressing the portion of second data, the second set of compression attributes being different than the first set of compression attributes;
creating compressed portion of second data based at least on compressing the portion of second data according to the second set of compression attributes; and
writing the compressed portion of second data to the third subset of storage clusters of the third container; and
after writing the compressed portion of second data to the third subset of storage clusters of the third container:

identifying a write operation to the portion of the second data, the write operation corresponding to data stored at a particular cluster in the third container;

redirecting the write operation to a fourth container;

marking the particular cluster in the third container as free based on redirecting the write operation to the fourth container;

uncompressing the compressed portion of the second data to create uncompressed second data;

creating compacted second data from the uncompressed second data, based at least on removing the data stored at the particular cluster from the uncompressed second data; and writing the compacted second data to a fifth container.

2. The method of claim 1, wherein creating the compressed portion of second data is also based on compacting the portion of second data prior to compressing the second data.

3. The method of claim 1, further comprising, based at least on compressing the portion of second data of the second container into the third container, freeing the second subset of storage clusters of the second container.

4. The method of claim 1, further comprising maintaining a heat map that tracks a corresponding set of input/output (I/O) statistics for each container of the set of containers.

5. The method of claim 4, wherein identifying the second set of compression attributes for use when compressing the portion of second data is based on the corresponding set of I/O statistics for the second container.

6. The method of claim 4, further comprising, based on a corresponding set of I/O statistics for the third container, decompressing the compressed portion of second data into an additional container.

7. The method of claim 1, wherein:
the first set of compression attributes comprises a first compression unit size and a first compression algorithm, and
the second set of compression attributes comprises a second compression unit size and a second compression algorithm.

8. The method of claim 7, wherein the first compression unit size is different than the second compression unit size.

9. The method of claim 7, wherein the first compression algorithm is different than the second compression algorithm.

10. The method of claim 1, wherein redirecting the write operation to a fourth container comprises redirecting the write operation to one or more free clusters of the fourth container as an uncompressed write.

11. The method of claim 1, further comprising freeing the third subset of storage clusters.

12. The method of claim 1, wherein writing the compacted second data to the fifth container comprises compressing the compacted second data according to a third set of compression attributes.

13. A computer system for managing compression of file system data at a container level, comprising:
a processor; and
a computer storage medium that stores computer-executable instructions that are executable by the processor to cause the computer system to at least:
identify a set of containers corresponding to a file system volume, each container in the set of containers corresponding to a different subset of storage clusters of the file system volume, the set of containers including at least:
a first container corresponding to a first subset of storage clusters storing first data that is compressed according to a first set of compression attributes,
a second container corresponding to a second subset of storage clusters storing second data that is uncompressed, and
a third container corresponding to a third subset of storage clusters that are free;
compress a portion of second data of the second container into the third container, including:
identifying a second set of compression attributes for use when compressing the portion of second data, the second set of compression attributes being different than the first set of compression attributes;
creating compressed portion of second data based at least on compressing the portion of second data according to the second set of compression attributes; and
writing the compressed portion of second data to the third subset of storage clusters of the third container; and
after writing the compressed portion of second data to the third subset of storage clusters of the third container:
identify a write operation to the portion of the second data, the write operation corresponding to data stored at a particular cluster in the third container;
redirect the write operation to a fourth container;
mark the particular cluster in the third container as free based on redirecting the write operation to the fourth container;
uncompress the compressed portion of the second data to create uncompressed second data;
create compacted second data from the uncompressed second data, based at least on removing the data stored at the particular cluster from the uncompressed second data; and
write the compacted second data to a fifth container.

14. The computer system of claim 13, wherein creating the compressed portion of second data is also based on compacting the portion of second data prior to compressing the second data.

15. The computer system of claim 13, wherein the computer-executable instructions that are executable by the processor to cause the computer system to free the second subset of storage clusters of the second container based at least on compressing the portion of second data of the second container into the third container.

16. The computer system of claim 13, wherein the computer-executable instructions that are executable by the processor to cause the computer system to maintain a heat map that tracks a corresponding set of input/output (I/O) statistics for each container of the set of containers.

17. The computer system of claim 13, wherein:
the first set of compression attributes comprises a first compression unit size and a first compression algorithm, and
the second set of compression attributes comprises a second compression unit size and a second compression algorithm.

18. A computer storage medium that stores computer-executable instructions that are executable by a processor to cause a computer system to at least:
identify a set of containers corresponding to a file system volume, each container in the set of containers corresponding to a different subset of storage clusters of the file system volume, the set of containers including at least:
- a first container corresponding to a first subset of storage clusters storing first data that is compressed according to a first set of compression attributes,
- a second container corresponding to a second subset of storage clusters storing second data that is uncompressed, and
- a third container corresponding to a third subset of storage clusters that are free;

compress a portion of second data of the second container into the third container, including:
- identifying a second set of compression attributes for use when compressing the portion of second data, the second set of compression attributes being different than the first set of compression attributes;
- creating compressed portion of second data based at least on compressing the portion of second data according to the second set of compression attributes; and
- writing the compressed portion of second data to the third subset of storage clusters of the third container; and after writing the compressed portion of second data to the third subset of storage clusters of the third container:
- identify a write operation to the portion of the second data, the write operation corresponding to data stored at a particular cluster in the third container;
- redirect the write operation to a fourth container;
- mark the particular cluster in the third container as free based on redirecting the write operation to the fourth container;
- uncompress the compressed portion of the second data to create uncompressed second data;
- create compacted second data from the uncompressed second data, based at least on removing the data stored at the particular cluster from the uncompressed second data; and
- write the compacted second data to a fifth container.

19. The computer system of claim 16, wherein identifying the second set of compression attributes for use when compressing the portion of second data is based on the corresponding set of I/O statistics for the second container.

20. The computer system of claim 16, wherein the computer-executable instructions that are executable by the processor to cause the computer system to decompress the compressed portion of second data into an additional container, based on a corresponding set of I/O statistics for the third container.

* * * * *